United States Patent [19]
Ko

[11] Patent Number: 5,793,935
[45] Date of Patent: Aug. 11, 1998

[54] PAPER SAVING APPARATUS FOR USE IN AN IMAGE FORMING SYSTEM

[75] Inventor: Chang-Kyung Ko, Suwon, Rep. of Korea

[73] Assignee: SamSung Electronics Co., Ltd., Suwon, Rep. of Korea

[21] Appl. No.: 897,759

[22] Filed: Jul. 21, 1997

Related U.S. Application Data

[63] Continuation of Ser. No. 358,174, Dec. 16, 1994, abandoned.

[30] Foreign Application Priority Data

Dec. 18, 1993 [KR] Rep. of Korea ............... 1993 28365

[51] Int. Cl.$^6$ .................................................. G06K 15/00
[52] U.S. Cl. ........................................... 395/102; 395/117
[58] Field of Search .................................. 395/112, 114, 395/106, 101, 102, 105, 110, 111, 115, 116, 117, 108, 113; 358/468, 436, 437, 438, 439, 498, 451, 404, 405, 406, 442, 444, 296; 282/284; 707/517, 518, 525, 527, 500, 508, 519, 520, 531, 542; 345/127; 347/131, 130

[56] References Cited

U.S. PATENT DOCUMENTS

| | | | |
|---|---|---|---|
| 4,450,442 | 5/1984 | Tanaka | 345/213 |
| 4,578,689 | 3/1986 | Spencer et al. | 347/129 |
| 4,853,683 | 8/1989 | Anton | 345/25 |
| 4,928,252 | 5/1990 | Grabbe et al. | 395/111 |
| 4,985,852 | 1/1991 | Ono et al. | 395/115 |
| 5,134,495 | 7/1992 | Frazier et al. | 358/298 |
| 5,227,882 | 7/1993 | Kato | 348/571 |
| 5,239,313 | 8/1993 | Marko et al. | 347/132 |
| 5,353,122 | 10/1994 | Kim | 358/296 |
| 5,375,001 | 12/1994 | Oh | 358/518 |
| 5,382,967 | 1/1995 | Curry | 347/223 |
| 5,455,636 | 10/1995 | Nagano et al. | 358/404 |
| 5,528,732 | 6/1996 | Klotz, Jr. | 395/106 |

*Primary Examiner*—Kim Vu
*Assistant Examiner*—Dov Popovici
*Attorney, Agent, or Firm*—Robert E. Bushnell, Esq.

[57] ABSTRACT

A paper saving apparatus for use in an image forming system includes a signal generator for changing periods of a horizontal line synchronizing signal and a video clock in response to input of paper saving information and generating a first horizontal line synchronizing signal and a first video clock, a data converter for converting a plurality of input data into an one page raster video data in response to the first horizontal line synchronizing signal and the first video clock, and a printer for printing the raster video data from the data converter.

19 Claims, 4 Drawing Sheets

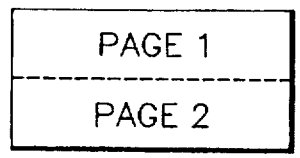
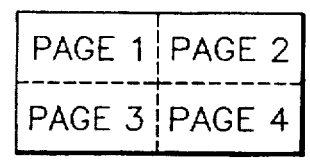
FIG. 5A  FIG. 5B
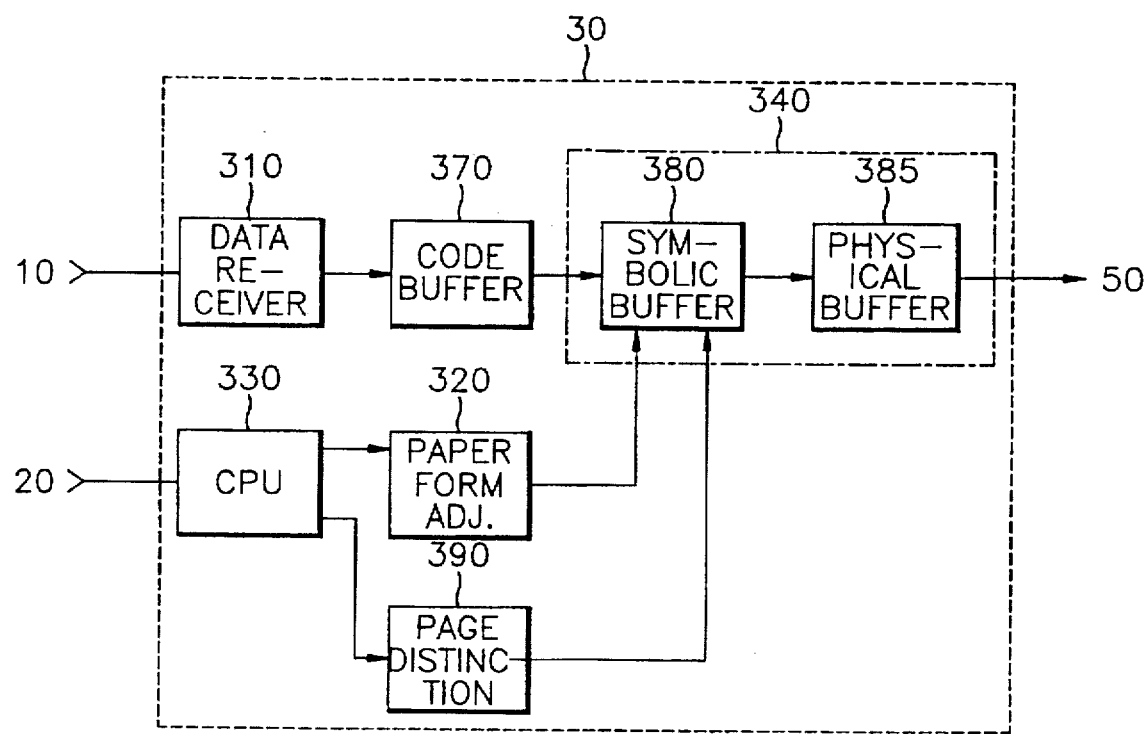
FIG. 6

PAPER SAVING APPARATUS FOR USE IN AN IMAGE FORMING SYSTEM

This is a contiuation of application Ser. No. 08/358,174, filed 16 Dec. 1994 now abandoned.

BACKGROUND OF THE INVENTION

The present invention relates to an image forming system, and more particularly to a paper saving apparatus for use in an image forming system for reducing a paper consumption.

Generally, in an image forming system such as a laser printer, there are merits such as low noise, high image quality, high speed of printing and multiple copy capability. However, maintenance costs due to electric power consumption, usage of toner and paper is a heavy burden to a user. A method for reducing the user's burden has been applied to an image forming system and has been developed at present. There exists a power saving apparatus for reducing the power consumption in the laser printer and toner saving apparatus for reducing a toner consumption. The power saving apparatus of the laser printer above-mentioned is described in U.S. patent application Ser. No. 08/176,450, entitled "Power Saving Apparatus for use in Peripheral Equipment of a Computer," filed on Dec. 30, 1993.

In order to use the laser printer effectively, there is a necessity to improve not only such power saving apparatus and toner saving apparatus, but also an apparatus for reducing paper consumption. The user may cleanly print documents, tables and diagrams which are made by oneself, for reporting or keeping. The user, meanwhile, may print the data as a draft in order to check the contents. Also, the user may amend the contents after printing. Before printing the final contents, the user performs the above-mentioned printing several times, and thus, paper consumption is increased. Generally, in the case that the user prints the draft only for checking the contents, it is done irrespective of the size of characters therein. Therefore, the paper consumption can be reduced by decreasing the size of characters, namely by printing the contents of two or more pages on one page. If the draft in quantity of twenty pages is printed on ten pages, the paper consumption of the other ten pages is eliminated. As an example, the cost, in consuming five hundred pages of Xerox 75 gram 4024 letter paper, is about $62, but if the consumption of ten pages is eliminated, there is a cost saving effect of about $1 since the cost of ten pages is $1.24.

SUMMARY OF THE INVENTION

It is therefore an object of the present invention provides a paper saving apparatus for use in an image forming system for reducing paper consumption.

To achieve this object, the prevent invention provides a paper saving apparatus for use in an image forming system. The paper saving apparatus comprises a signal generator for changing the periods of a horizontal line synchronizing signal and a video clock signal in response to input of paper saving information and generating a first horizontal line synchronizing signal and a first video clock, a data converter for converting a plurality of page input data into one page of raster video data in response to the first horizontal line synchronizing signal and the first video clock, and a printer for receiving and printing the raster video data received from the data converter.

BRIEF DESCRIPTION OF THE DRAWINGS

The above objects and other advantages of the present invention will become more apparent by describing the preferred embodiment of the present invention with reference to the attached drawings, in which:

FIGS. 5A and 5B are diagrams illustrating page division on the printing and on a computer according to the present invention.

FIG. 6 is a diagram illustrating one embodiment of a controller according to the present invention.

DETAILED DESCRIPTION OF THE PREFERRED EMBODIMENT

Figure 1:
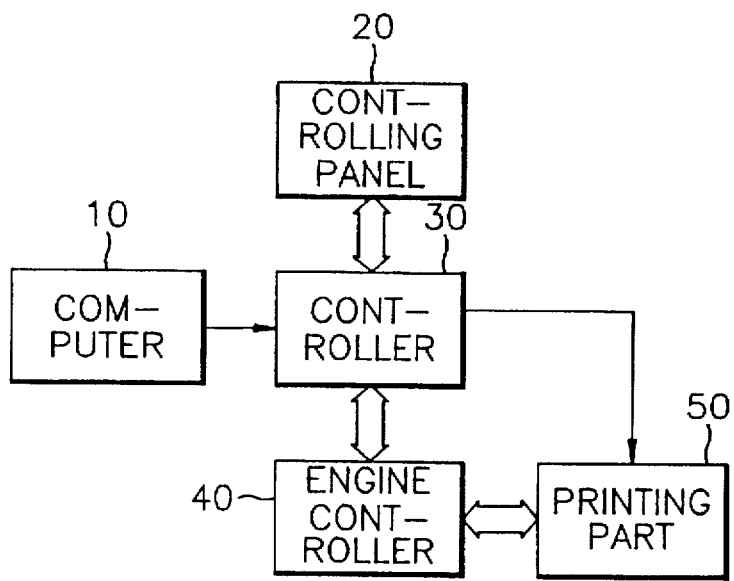
FIG. 1 is a schematic block diagram illustrating a general construction of a laser printer.

The laser printer being used generally at present is classified into a laser beam printer (or Laser Scanning Unit: hereinafter, referred to as "LSU") and an LED(Light Emitting Diode) printer. But, since a laser printer combining both the LSU and LED systems is possible to be implemented, the present invention will describe the laser printer combining both the LSU and LED systems. Thus, in the diagrams, it should be noted that the laser printer which includes both the LSU and LED systems is illustrated. Also, the same elements in the diagrams show the same reference numerals at any place as possible.

FIG. 1 is a schematic block diagram of a general laser printer. The general laser printer is comprised of a computer 10, in which a user creates data, for transmitting the data to the printer when printing data, a controlling panel 20 for setting the user's requirement before printing, in order to print the data according to the user's requirement such as paper size and a page number set, etc., a controller 30 for converting the data received from the computer 10 into printable raster video data, according to the user's requirement determined in the controlling panel 20, an engine controller 40 for generating and controlling a horizontal line synchronizing signal $H_{SYNC}$ which indicates a departure of the raster video data converted in the controller 30 and a video clock signal $V_{CLK}$ which transmits the raster video data, and a printing part 50 (LED head or LSU) for printing the raster video data according to the signal generated in the engine controller 40.

A series of operation procedures in the controller 30, which convert the data received from the computer 10 into the raster video data, are called a DMA(Direct Memory Access). In order to control operation of the DMA, the controller 30 should apply the signal $H_{SYNC}$ as a departing signal for one line of the raster video data and the $V_{CLK}$ for transmitting the raster video data. A period of the $H_{SYNC}$ is decided depending upon a linear velocity of an engine drum and by a resolution factor which is determined by the engine and the controller 30. For example, if the linear velocity of drum is 31.4 mm/sec and the resolution is 300 dpi, it becomes that the period of the signal $H_{SYNC}$ =distance/velocity =(25.4/300)/31.4=2.69=2.7 msec.

If the period of the signal $H_{SYNC}$ is reduced to half, namely to 1.35 msec, dot size in the horizontal direction is not changed, but dot size in the vertical is reduced to half. In the printer that the period of the signal $H_{SYNC}$ is reduced to half, if the printer receives data having the quantity of two pages from the computer 10, the page quantity to be printed is possible with only one page. If a draft of twenty pages in quantity is printed on ten pages, consumption of the last ten pages can be eliminated.

Figure 2:
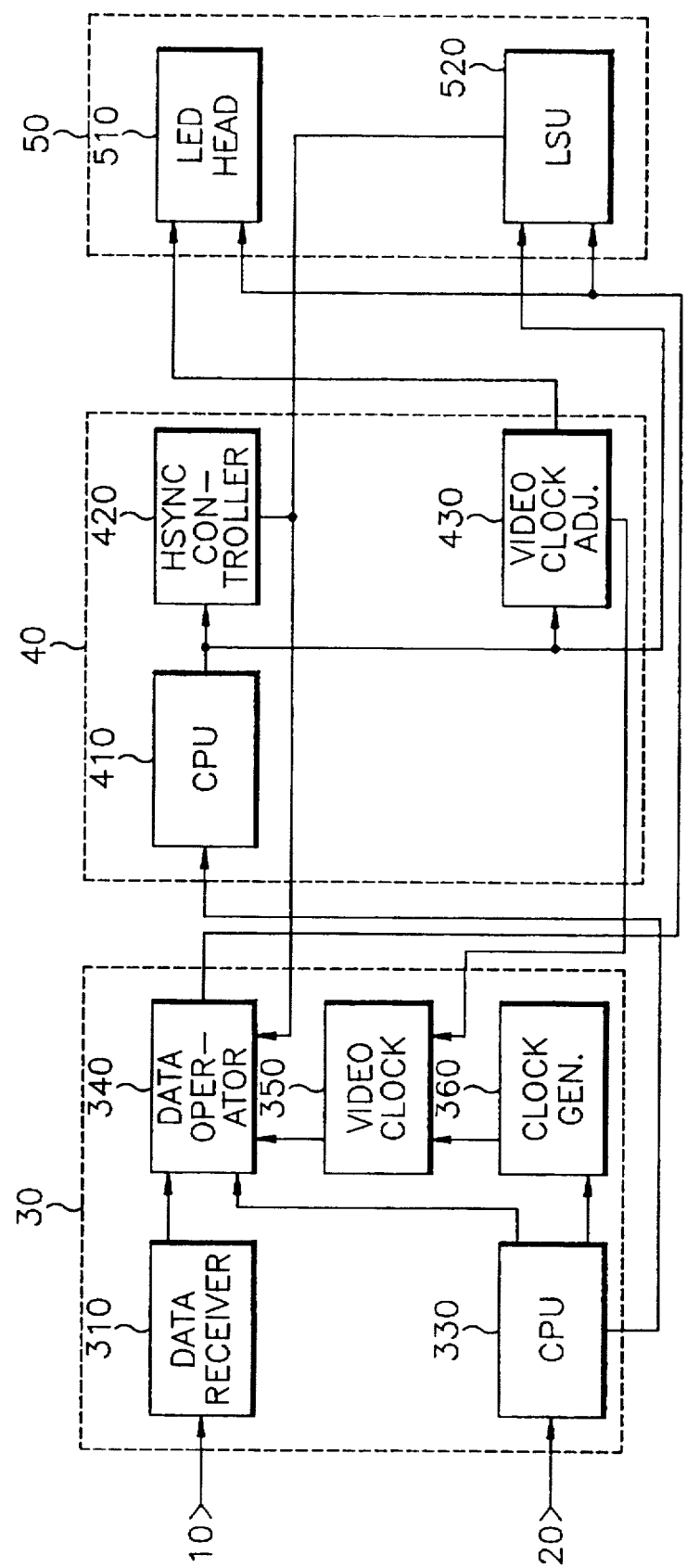
FIG. 2 is block diagram illustrating a signal flow in the laser printer according to the present invention.

FIG. 2 is a block diagram illustrating signal flow in the controller 30, the engine controller 40, and the printing part 50 of the laser printer according to the present invention.

Referring to FIG. 2, the following describes operations of the paper saving mode. In operation of the present invention, the paper saving mode for printing the data of two pages on one page is selected. If the user selects the paper saving mode with the controlling panel 20, a CPU(Central Processing Unit) 330 of the controller 30 receives the paper saving mode selected by the user, and then transmits a command indicative of the paper saving to a CPU 410 of the engine controller 40 in order to control the operation of paper saving. After receiving the command of paper saving, the CPU 410 of engine controller 40 transmits the command of paper saving to a horizontal synchronizing signal controller 420, a video clock adjuster 430 and an LSU 520. Accordingly, the horizontal synchronizing signal controller 420 generates the signal $H_{SYNC}$ in a period ½ T as half the period T of the signal $H_{SYNC}$. Also, the LSU 520 which has received the command of paper saving generates the signal $H_{SYNC}$ in the period ½ T as half the period T of the signal $H_{SYNC}$. The signal $H_{SYNC}$ generated as mentioned above is applied to a DMA operator 340 of controller 30.

Meanwhile, in order to scan data of one line during one period being a normal state of the signal $H_{SYNC}$, there is a necessity to increase by two period of the $V_{CLK}$ since the period T of the $H_{SYNC}$ is reduced to the period ½ T. If the period of the $H_{SYNC}$ is reduced to half and if the period being a normal state of the $V_{CLK}$ is applied, the raster video data is scanned on one line, and second line remains blank. That is, the printing on a page, such as the scanning on a first line, the blank state on a second line, the scanning on a third line, and the blank state on a fourth line, etc., is repeated. Therefore, a complete paper saving operation is not performed. For such a reason, the CPU 330 of controller 30 transmits a command for increasing by two the period of the $V_{CLK}$ to a clock generator 360 and the CPU 410 of engine controller 40. After receiving the command for increasing by two the period of the $V_{CLK}$, by two the CPU 410 of engine controller 40 transmits the command for increasing the period of the $V_{CLK}$ by two to the video clock adjuster 430. The clock generator 360 and the video clock adjuster 430 which have received the command as above-mentioned generate the $V_{CLK}$ increased in period by two. These generated signals are transmitted to a video clock part 350 and an LED head 510, and then are also transmitted to the DMA operator 340.

In the paper saving mode as above-mentioned, the period of the signal $H_{SYNC}$ is reduced in half, and the period of the $V_{CLK}$ is increased by two, and then the signals are applied to the DMA operator 340. Thereby, the DMA operator 340 converts the data received from a data receiver 310 into the raster video data, and the converted data is transmitted to the LED head 510 or to the LSU 520 and then is printed. At this time, the data to be printed with the quantity of two pages on the computer 10 is printed as the quantity of one page.

The above-mentioned $H_{SYNC}$ signal and $V_{CLK}$ are generated at two places, which is to be embodied in the printer combining both the LED printer and the LSU. In the case that the LED printer is used, the signal $H_{SYNC}$ is generated in the horizontal synchronizing signal controller 420, and in the case that the LSU is used, the signal $H_{SYNC}$ is generated in the interior of LSU. The $V_{CLK}$ can be generated in the engine controller 40 or in the controller 30. In order to generate the $V_{CLK}$ in the engine controller 40, the $V_{CLK}$ can be generated in the video clock adjuster 430. Also, in order to generate the $V_{CLK}$ in the controller 30, the $V_{CLK}$ can be generated in the clock generator 360 and in the video clock part 350. Such places where the $H_{SYNC}$ signal and the $V_{CLK}$ are generated can be selected according to the user's requirement.

Figures 3A, 3B:
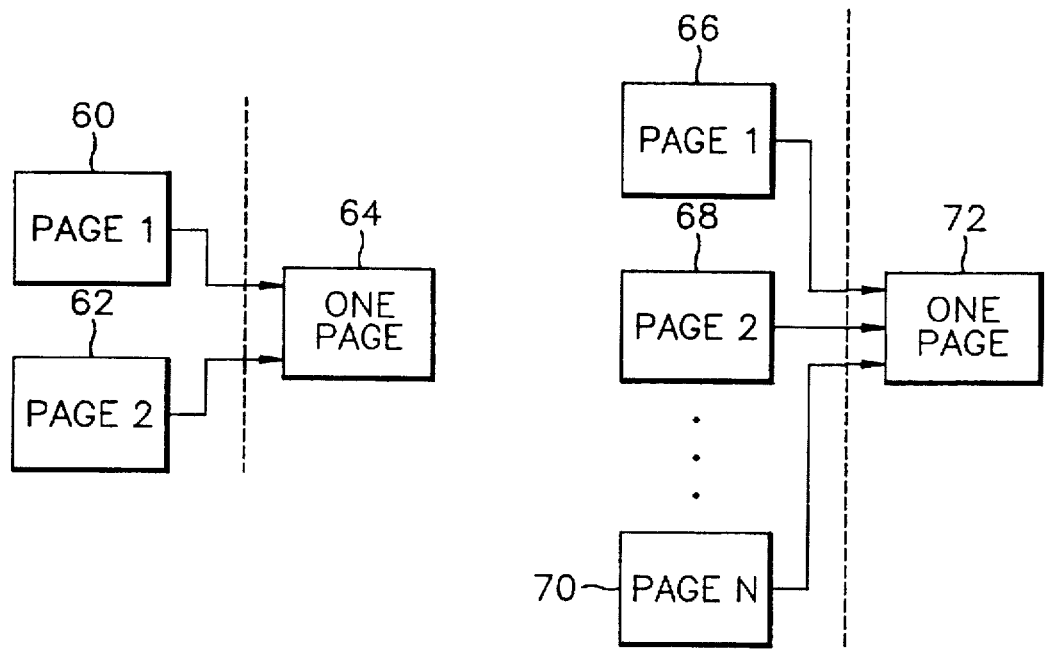
FIGS. 3A and 3B are diagrams illustrating that data of numerous pages of data can be printed as one page of data according to the present invention.

FIGS. 3A and 3B show that the data in the computer is converted into the raster video data and then the converted data is printed by the printer, in the paper saving mode according to the present invention as shown in FIG. 2.

FIG. 3A shows that the data of a quantity of two pages on the computer is printed as one page by the printer. FIG. 3B shows that data of a quantity of N pages on the computer is printed as one page by the printer.

Figure 4:
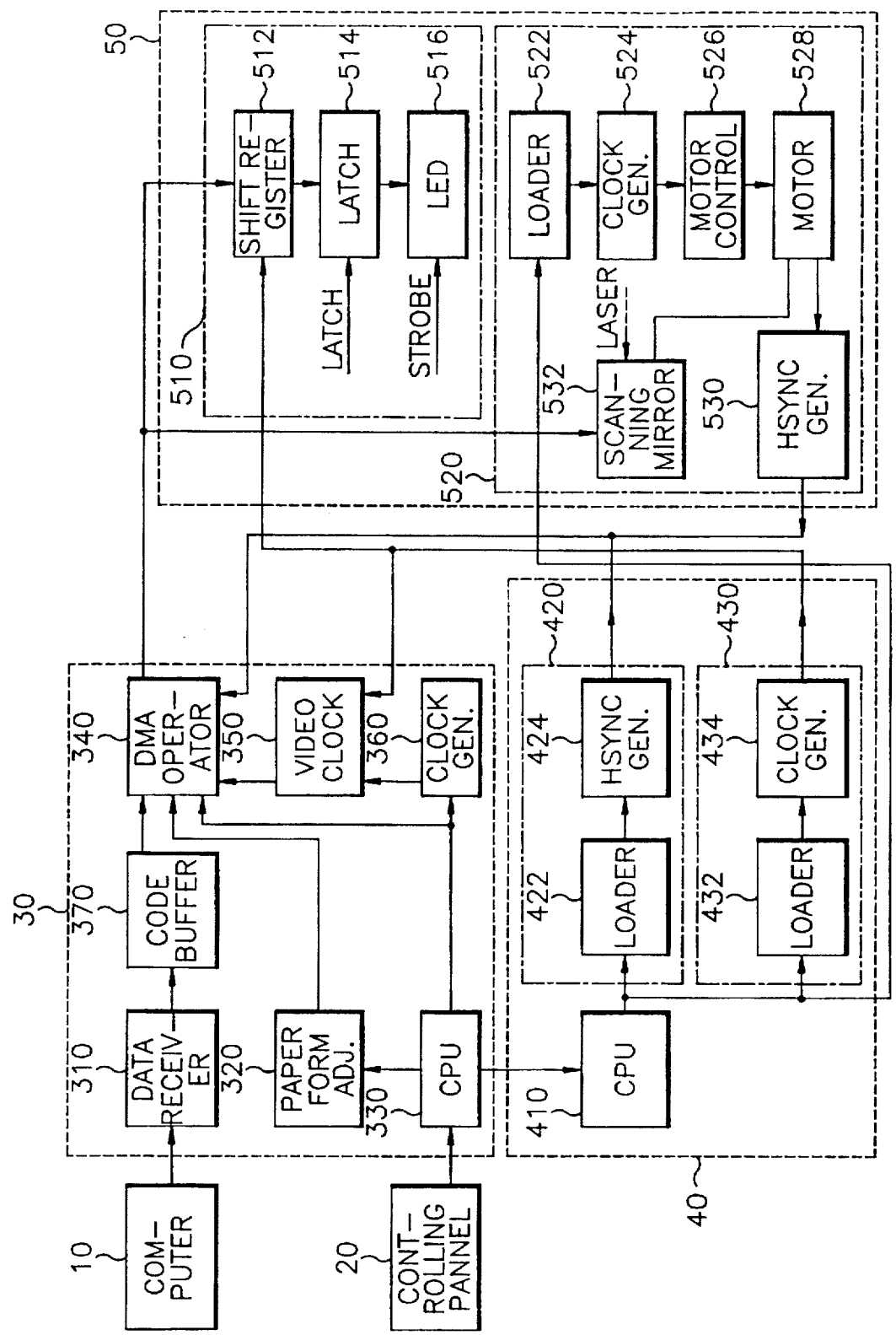
FIG. 4 is a detailed block diagram illustrating a construction of the laser printer according to the present invention.

FIG. 4 is a detailed block diagram of the laser printer according to the present invention, and namely, shows the block diagram of FIG. 2 in more detail. Referring to the attached diagrams, the following describes a construction of the laser printer for performing operations of paper saving according to the present invention.

As described in FIG. 1, the laser printer is composed of the controlling panel 20, the controller 30, the engine controller 40 and the printing part 50.

The controller 30 is composed of a CPU 330 for recognizing the user's requirement established by a key input in the controlling panel 20; the data receiver 310 for receiving data from the computer 10; a code buffer 370 for storing temporarily the data from the data receiver 310; a paper form adjuster 320 for generating a form feed code for indicating a form feed on respective pages in correspondence with the user's requirement from the CPU 330 which has recognized the user's requirement; the DMA operator 340 for receiving the form feed code from the paper form adjuster 320 and for converting the data stored temporarily in the code buffer 370 into the raster video data; the video clock part 350 for generating the video clock signal $V_{CLK}$ for transmitting the video data converted in the DMA operator 340 to the LED head 510 or to the LSU 520; and the clock generator 360 for transmitting the clock signal to the video clock part 350.

The engine controller 40 is composed of the CPU 410 for receiving a signal corresponding to the user's requirement from the CPU 330 of controller 30; the horizontal synchronizing signal controller 420 for generating the signal $H_{SYNC}$ corresponding to the signal output from the CPU 410; and the video clock adjuster 430 for generating the clock signal $V_{CLK}$ corresponding to the signal output from the CPU 410. The horizontal synchronizing signal controller 420 is composed of a loader 422 for determining the period of the signal $H_{SYNC}$, and a counter or a timer 424 for generating the signal $H_{SYNC}$ according to the period decided in the loader and for applying the signal $H_{SYNC}$ to the DMA operator 340 of the controller 30. The video clock adjuster 430 is composed of a loader 432 for deciding the VA period, and a clock generator 434 for generating the $V_{CLK}$ according to the period decided in the loader 432 and for applying the $V_{CLK}$ to the video clock part 350 of the controller 30.

The LED head 510 is composed of a shift register 512 for receiving the video data from the DMA operator 340 of controller 30, a latch 514 for latching the video data received in the shift register 512 during a given time according to a latch signal of an LED controller which is not shown in the diagram, and an LED 516 for outputting the data stored in the latch 514 according to a strobe signal of the LED controller not shown in the diagram.

The LSU 520 is composed of a loader 522 for inputting an output signal corresponding to the user's requirement from the CPU 410 of engine controller 40 and for determining the period of the signal $H_{SYNC}$; a clock generator 524 for generating a clock signal according to the period decided from the loader 522; a motor controlling circuit 526 for generating a signal for controlling a motor corresponding to the clock signal generated from the clock generator 524; a motor 528 being driven in response to the signal generated from the motor controlling circuit 526; a horizontal synchronizing signal generator 530 for generating the horizontal synchronizing signal $H_{SYNC}$ corresponding to a speed of the motor 528 and for applying the generated $H_{SYNC}$ to the DMA operator 340 of controller 30; and a scanning mirror 532 coupled to the motor 528 for scanning data from the DMA operator 340 by one line unit in response to a laser input to print out data.

The following describes the laser printer for performing operations of paper saving under the above-mentioned construction.

If the user selects the paper saving mode by the key input in the controlling panel 20, the CPU 330 of controller 30 receives the user's requirement. And then, the CPU 330 decides the quantity of paper to be saved, when the data received from the computer 10 is stored in the code buffer 370 or when the data performs the DMA operation, i.e. decides as to whether data having a quantity of two pages is printed as one page or whether data having a quantity of three pages is printed as one page. Namely, in response to the quantity of paper saving to be performed, the paper form adjuster 320 decides the form feed code which adjusts the form feed on respective pages. In an embodiment of the present invention, the form feed code of paper is generated so that data having a quantity of two pages can be printed on one page.

After receiving the user's requirement, the CPU 330 of controller 30 and the CPU 410 of engine controller 40 apply the periods of the horizontal synchronizing signal $H_{SYNC}$ and the video clock signal $V_{CLK}$ which correspond to the requirement of paper saving, to the loaders 422 and 432. According to the periods of horizontal synchronizing signal $H_{SYNC}$ and video clock signal $V_{CLK}$ which are decided in the loaders 422 and 432, the counter or timer 424 and the clock generator 434 generate the horizontal synchronizing signal HSYNC and the video clock signal $V_{CLK}$, which control operations of the DMA operator 340. Also, according to the signal output from the CPU 410 of engine controller 40, the period of horizontal synchronizing signal $H_{SYNC}$ is decided in the loader of LSU 520. In response to the decided period of horizontal synchronizing signal $H_{SYNC}$, the clock generator 524 generates a clock signal. And, in response to the generated clock signal, the motor controlling circuit 526 and the motor 528 operate. In response to the speed of the driving motor 528, the horizontal synchronizing signal generator 530 generates the horizontal synchronizing signal $H_{SYNC}$. And also, according to the signal corresponding to the user's requirement output from the CPU 330 of controller 30, the clock generator 360 and the video clock part 350 generate the video clock signal $V_{CLK}$.

In the above, it is described that the horizontal synchronizing signal $H_{SYNC}$ and the video clock signal $V_{CLK}$ are generated in all components in the laser printer. But, according to the case that the LED printer or the LSU is selected, a signal is generated selectively. In an engine which uses the LED head 510, the horizontal synchronizing signal controller 420 of engine controller 40 generates the $H_{SYNC}$. That is, the CPU 410 of engine controller 40 receives the command signal according to the paper saving from the CPU 330 of controller 30, and applies the command signal to the loader 422 of the horizontal synchronizing signal controller 420. Then, a load value corresponding to the paper saving is applied to the horizontal line synchronizing signal generator 424, and the horizontal line synchronizing signal generator 424 generates the horizontal synchronizing signal $H_{SYNC}$ of the period reduced in half corresponding to the paper saving.

Meanwhile, in an engine which uses the LSU 520, the horizontal synchronizing signal generator 530 generates the horizontal synchronizing signal $H_{SYNC}$ having the period reduced in half corresponding to the paper saving. That is, the CPU 410 of engine controller 40 applies a load value of the clock generator 524 for varying the speed of motor, to the loader 522, in response to the paper saving mode. According to the decided load value as above-mentioned, the clock generator 524 generates the clock signal, and thereby the motor controlling circuit 526 operates to drive the motor 528. According to the speed of motor 528 driven, the horizontal synchronizing signal generator 530 generates the horizontal synchronizing signal $H_{SYNC}$ having the period reduced in half.

The video clock signal $V_{SYNC}$ needs the increased period in correspondence with the generation of horizontal synchronizing signal $H_{SYNC}$ having the reduced period. And, the video clock signal $V_{CLK}$ is generated in the video clock part 350, in the clock generator 360 or in the video clock adjuster 430. As above-mentioned, the video clock signal $V_{CLK}$ can be generated in the controller 30 or in the engine controller 40 selectively. Generally, in the case that uses the LED head 510, the video clock signal $V_{CLK}$ is generated in the engine controller 40, while in the case that uses the LSU 520, the video clock signal $V_{CLK}$ is generated in the controller 30.

Accordingly, the horizontal synchronizing signal $H_{SYNC}$ of a period reduced in half, the video clock signal $V_{CLK}$ of period increased by two and the form feed code are applied to the DMA operator 340. The DMA operator 340 converts the data having a quantity of two pages into the raster video data of one page, and then transmits the data to the LED head or the LSU so that the data can be printed. Referring to FIG. 3, if the paper saving mode for printing the data having a quantity of two pages on one page is selected in the controlling panel 20, the data having a quantity of two pages 60 and 62 on the computer 10 can be printed as one page 64, as shown in FIG. 3A. Also, if the paper saving mode for printing data having a quantity of pages N on one page is selected in the controlling panel 20, the data having a quantity of N pages from 66 to 70 on the computer 10 can be printed as one page 72, as shown in FIG. 3B.

FIGS. 5A and 5B show that data of respective pages on the computer are divided on one page, the case that data having a quantity of two pages and four pages are printed as one page respectively, by selecting the paper saving mode on the controlling panel 20. That is, in the case that data of two pages is printed as one page, as shown in FIG. 5A, the data of a first page is printed on the upper part of a dotted line, and the data of a second page is printed on the lower part of the dotted line. In case that the data of four pages is printed as one page, as shown in FIG. 5B, the data of a first page is printed on the left side of the upper part of paper. And also, the data of a second page is printed on the right side of the upper part of the paper, the data of a third page is printed on the left part of the lower part of the paper, and the data of a fourth page is printed on the right side of the lower part of the paper.

FIG. 6 shows an embodiment of the controller 30 according to the present invention. The controller 30 in the construction shown in FIG. 6 is composed of the data receiver 310 for receiving the data transmitted from the computer 10; the code buffer (the inputting buffer) 370 for storing temporarily the received data; the CPU 330 for receiving the user's requirement of the paper saving mode from the controlling panel 20; the paper form adjuster 320 for adjusting the form feed code as a paper ejecting control code according to the user's requirement of the paper saving mode applied to the CPU 330; a page division adjuster 390 for deciding how many pages of data is printed as one page, according to the user's requirement of the paper saving mode received and then for dividing the data of the respective page; a symbolic buffer 380 for generating a code necessary to convert the data stored in the code buffer (the inputting buffer) 370 into the raster video data corresponding to the paper saving mode, according to the decision of the paper form adjuster 320 and the page division adjuster 390; and a physical buffer 385 for converting the data stored in the code buffer (the inputting buffer) 370 into the raster video data according to the raster video data code corresponding to the paper saving mode.

Since the code buffer (the inputting buffer) 370, the symbolic buffer 380 and the physical buffer 385 are used generally in the laser printer at present, the detailed data processing procedure is herein avoided. Also, the symbolic buffer 380 and the physical buffer 385 are the DMA operator 340 shown in FIGS. 2 and 4.

The data received from the computer 10 is stored in the code buffer(the inputting buffer) 370 temporarily. The user's requirement of the paper saving mode determined in the controlling panel 20 is received in the CPU 330. Then, the CPU 330 applies the signal corresponding to the paper saving mode to the paper form adjuster 320 and to the page division adjuster 390. In response to the applied signal, the paper form adjuster 320 applies the form feed code to the symbolic buffer 380, and the page division adjuster 390 applies a signal for informing the symbolic buffer 380 of the page division. After receiving the form feed code and the signal for indicating the page distinction, the symbolic buffer 380 generates a signal corresponding to the paper saving mode. Thereby, the physical buffer 385 converts the data stored in the code buffer(the inputting buffer) 370 into the raster video data, in response to the signal of paper saving mode from the symbolic buffer 380. And then, the physical buffer 385 transmits the converted data to the LED head 510 or to the LSU 520 so that the data can be printed. At this time, the printed video data has a difference according to a selection of the paper saving mode. The data of two pages from the computer 10 can be printed as one page, or data of more than two pages can be also be printed as one page.

In the laser printer as afore-mentioned, the paper consumption generated according to the data printed for a check, can be reduced by determining the paper saving mode in the controlling panel. By reducing the period of the horizontal synchronizing signal and by increasing the period of the video clock signal, in the laser printer, data having a quantity of two pages or of numerous pages can be printed as one page. It will be apparent to those skilled in the art that data having more than two pages can be printed on one page, as discussed in the present invention. Accordingly, since usage expenses of the laser printer can be reduced, the laser printer according to the present invention can be operated efficiently.

What is claimed is:

1. A paper saving apparatus for use in an image forming system having an operational panel for permitting user input of paper saving information indicative of a number of pages of input data to be printed on a single sheet of paper, comprising:

signal generating means for adjusting periods of a horizontal line synchronizing signal and a video clock signal and generating said horizontal line synchronizing signal and said video clock signal in response to user input of paper saving information from said operational panel indicating the number of pages of input data to be printed on said single sheet of paper, said number of pages being greater than two;

data conversion means coupled to receive said input data from an external communication device to be printed on said single sheet of paper, for converting said input data into one page of raster video data in response to said horizontal line synchronizing signal and said video clock signal; and printing means for printing said one page of raster video data received from said data conversion means on said single sheet of paper using a light emitting diode head.

2. The paper saving apparatus as claimed in claim 1, further comprised of said operational panel having predetermined printing functions for generating a paper saving mode selection signal in response to user selection of a paper saving mode permitting a selected multiple of pages greater than two pages of input data to be printed on each sheet of paper.

3. The paper saving apparatus as claimed in claim 2, wherein said data conversion means comprises:

a central processing unit for extracting said paper saving information from said paper saving mode selection signal;

printing data determining means for determining said number of pages of data to be printed on said single sheet of paper in dependence upon said paper saving information;

data storing means for receiving in sequence and storing temporarily said input data received from said external communication device; and printing data conversion means for converting said input data stored in said data storing means into said one page of raster video data in dependence upon said horizontal line synchronizing signal and said video clock signal.

4. The paper saving apparatus as claimed in claim 3, wherein said signal generating means comprises:

signal period determining means for determining said periods of said horizontal line synchronizing signal and said video clock signal in dependence upon said paper saving information;

horizontal line synchronizing signal generating means for generating said horizontal line synchronizing signal corresponding to a period of said horizontal line synchronizing signal determined by said signal period determining means; and video clock signal generating means for generating said video clock signal corresponding to a period of said video clock signal determined by said signal period determining means.

5. The paper saving apparatus as claimed in claim 4, wherein said horizontal line synchronizing signal generating means generates said horizontal line synchronizing signal having said period decreased by a first factor in response to said paper saving information.

6. The paper saving apparatus as claimed in claim 5, wherein said video clock signal generating means generates said video clock signal having said period increased by a second factor in response to said paper saving information, said first factor being inversely proportional to said second factor.

7. The paper saving apparatus as claimed in claim 6, wherein said printing means comprises:

conversion data storing means for receiving in sequence and storing temporarily said one page of raster video data; and said light emitting diode head for printing said one page of raster video data stored in said conversion data storing means on said single sheet of paper.

8. A paper saving apparatus for use in an image forming system having an operational panel for permitting user input of paper saving information indicative of a selected number of pages of input data to be printed on a single sheet of paper, comprising:

paper saving information extracting means for extracting paper saving information from a paper saving mode selection signal received from said operational panel indicating the selected number of pages of input data to be printed on said single sheet of paper said selected number of pages being greater than two;

first clock generating means for generating a first clock signal having a period based upon a period of a first horizontal line synchronizing signal;

data conversion means coupled to receive said input data from an external communication device, for converting said input data of said selected number of pages into one page of raster video data in response to said first horizontal line synchronizing signal and said first clock signal; and printing means for in response to said paper saving information, generating said first horizontal line synchronizing signal and for printing said one page of raster video data on said single sheet of paper.

9. The paper saving apparatus as claimed in claim 8, further comprised of said operational panel having predetermined printing functions for generating said paper saving mode selection signal in response to user selection of a paper saving mode permitting said selected number of pages greater than two pages of input data to be printed on each sheet of paper.

10. The paper saving apparatus as claimed in claim 9, wherein said paper saving information extracting means comprises:

a central processing unit for extracting said paper saving information from said paper saving mode selection signal; and printing data determining means for determining an amount of input data to be printed on said single sheet of paper in dependence upon said paper saving information.

11. The paper saving apparatus as claimed in claim 10, wherein said data conversion means comprises:

data storing means for storing said input data received from said external communication device; and printing data conversion means for converting said input data stored in said data storing means into said one page of raster video data in response to said first horizontal line synchronizing signal and said first clock signal.

12. The paper saving apparatus as claimed in claim 11, wherein said printing means comprises:

second clock generating means for determining a period for a second clock signal and generating said second clock signal in dependence upon said paper saving information;

a motor for rotating in response to said second clock signal generated by said second clock generating means;

horizontal line synchronizing signal generating means for generating said first horizontal line synchronizing signal having said period corresponding to a rotational velocity of said motor; and a scanning mirror coupled to said motor, for scanning said one page of raster video data by line units in response to an input of a laser beam and printing said one page of raster video data on said single sheet of paper.

13. The paper saving apparatus as claimed in claim 12, wherein said horizontal line synchronizing signal generating means generates said first horizontal line synchronizing signal having said period decreased by a first factor in response to said paper saving information.

14. The paper saving apparatus as claimed in claim 13, wherein said first clock generating means generates said first clock signal having said period increased by a second factor in response to said paper saving information said first factor being inversely proportional to said second factor.

15. A method for saving paper in an image forming system having an operational panel for permitting user input of paper saving information indicative of a selected multiple of pages of input data to be printed on each single sheet of paper, comprising the steps of:

entering, via said operational panel, paper saving information indicating said selected multiple of pages of input data to be printed on a single sheet of paper;

generating a horizontal line synchronizing signal and a video clock signal in response to said paper saving information, said horizontal line synchronizing signal having a period multiplied by a first factor and said video clock signal having a period multiplied by a second factor, said first factor being inversely proportional to said second factor;

receiving said input data from an external communication device, and converting said input data of said selected multiple of pages into one page of raster video data in response to said horizontal line synchronizing signal and said video clock signal; and printing said one page of raster video data on said single sheet of paper.

16. The method as claimed in claim 15, wherein said second factor is greater than said first factor.

17. The method as claimed in claim 15, wherein said printing step is performed using one of a laser beam printer and a light-emitting diode printer.

18. The method as claimed in claim 15, wherein said first factor equals one-half and said second factor equals two when an amount of said input data to be printed on said single sheet of paper equals two pages of said input data.

19. A method for saving paper in an image forming system having an operational panel for permitting user input of paper saving information indicative of a selected multiple of pages of input data to be printed on each single sheet of paper, comprising the steps of:

receiving, in response to a user input from said operational panel, paper saving information indicating the selected multiple of pages of input data to be printed on a single sheet of paper, said selected multiple of pages being greater than two;

generating a horizontal line synchronizing signal and a video clock signal in response to said paper saving information by dividing a first period of said horizontal line synchronizing signal by said selected multiple of pages and multiplying a second period of said video clock signal by said selected multiple of pages;

receiving said input data from an external communication device, and converting said input data of said selected multiple of pages into one page of raster video data in response to said horizontal line synchronizing signal and said video clock signal; and printing said one page of raster video data on said single sheet of paper.

* * * * *